US012737199B2

(12) United States Patent
Galloway et al.

(10) Patent No.: US 12,737,199 B2
(45) Date of Patent: Sep. 15, 2026

(54) MIRROR INTERFACE FOR ACCESSIBLE USERS

(71) Applicant: Wells Fargo Bank, N.A., San Francisco, CA (US)

(72) Inventors: Alexander Xavier Galloway, West Jordan, UT (US); Jason Scott Hoffman, Urbandale, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 264 days.

(21) Appl. No.: 18/605,965

(22) Filed: Mar. 15, 2024

(65) Prior Publication Data

US 2025/0291608 A1 Sep. 18, 2025

(51) Int. Cl.
*G06F 9/451* (2018.01)
*G06F 16/957* (2019.01)

(52) U.S. Cl.
CPC .......... *G06F 9/451* (2018.02); *G06F 16/9577* (2019.01)

(58) Field of Classification Search
CPC ............................. G06F 9/451; G06F 16/9577
See application file for complete search history.

(56) References Cited

U.S. PATENT DOCUMENTS 10,360,466 B2 7/2019 Wu et al.
11,557,105 B2 1/2023 Joshi et al.
2014/0337033 A1* 11/2014 Kim ...................... G06F 3/0412 704/260
2016/0321955 A1 11/2016 Zhu et al.
2022/0292173 A1 9/2022 Henry et al.
2022/0366131 A1* 11/2022 Ekron ..................... G06F 9/453
2024/0118785 A1* 4/2024 Humphrey ........ H04M 1/72481

FOREIGN PATENT DOCUMENTS

CN 108184088 A 6/2018

OTHER PUBLICATIONS

Unity Manual 5.6, Mar. 7, 2024, "unity.pdf", 2 pages. (Year: 2024).*
Zhao, Designing Technologies to Make Virtual Reality Accessible for People with Visual Impairments, Nov. 19, 2021, 33:58-55:40.
Strasser, Unity Accessibility Toolkit: Enhancing Accessibility of Video Games for People with Vision Impairments, Master's Thesis, May 2021, 48-100, Graz University of Technology.
Cáceres Muñoz, Designing User Experiences: A Game Engine for the Blind, Bachelor's Thesis, Jul. 3, 2017, pp. 12, 17, 19-21, 33-36, 51-52, 55, 57, & 76, Universidad Carlos III de Madrid.
Trudeau, Making the Easy Accessibility Package, Honors Project, 2021, pp. 16-20, Grand Valley State University.

(Continued)

*Primary Examiner* — Haoshian Shih
(74) *Attorney, Agent, or Firm* — Merchant & Gould P.C.

(57) ABSTRACT

Provided is a toggleable mirror interface that integrates with native device accessibility features to convert an inaccessible interactive user experience into an accessible experience. Elements of the user experience are processed to be presented in an accessible format on the mirror interface, which becomes the primary interface for users requiring such accessibility. The mirror interface presents accessible elements as the interactive user experience progresses to enable an accessible experience.

20 Claims, 8 Drawing Sheets

(56) References Cited

OTHER PUBLICATIONS

Mott et al., Accessible By Design: An Opportunity for Virtual Reality. 2019 IEEE International Symposium on Mixed and Augmented Reality Adjunct (ISMAR-Adjunct), Oct. 2019, pp. 1-2. Beijing, China.
Hossain et al., UEmbed: An Authoring Tool to Make Game Development Accessible for Users Without Knowledge of Coding, Apr. 2023, studiumdigitale, Goethe University Frankfurt, Frankfurt am Main, Germany.
Waskiewicz, Virtual Reality for the Visually Impaired, Master's Thesis, Jun. 3, 2022, University of Bergen, Department of linguistic, literary, and aesthetic Studies.
Dudley et al., Inclusive Immersion: a review of efforts to improve accessibility in virtual reality, augmented reality, and the metaverse, Sep. 12, 2023, pp. 2989-3020, vol. 27, Virtual Reality.
Rodríguez Benítez, Serious games for visually impaired players and to promote first-aid protocols, Doctoral Thesis, 2020, Universitat de Girona.
Senff. Design and implementation of web-based navigation concepts for a multi-dimensional product catalog, Master's Thesis, Apr. 2023, Berlin University of Applied Sciences (HTW).
Perdigueiro et al., A look at mobile screen reader support in the Unity Engine, Jan. 19, 2024, Unity Blog, Engine & platform. https://blog.unity.com/engine-platform/mobile-screen-reader-support-in-unity.

* cited by examiner

MIRROR INTERFACE FOR ACCESSIBLE USERS

BACKGROUND

A screen reader is assistive technology that allows visual input to be output in a nonvisual way, such as speech. This form of assistive technology is essential to people who are blind, visually impaired, illiterate or have cognitive disabilities affecting the ability to read text.

While screen reader technology can successfully make webpages and other primarily text-based screens accessible for visually-impaired users, screen readers are not readily adaptable for more highly interactive experiences like games. The complexity of games and experiences produced by them cannot be integrated directly into current screen reader technology.

SUMMARY

Examples described provide a toggleable mirror interface that integrates with native device accessibility features to convert an inaccessible interactive user experience into an accessible experience. Elements of the user experience are processed to be presented in an accessible format on the mirror interface, which becomes the primary interface for users requiring such accessibility. The mirror interface presents accessible elements as the interactive user experience progresses to enable an accessible experience.

According to a first aspect, a method of providing a user-interactive screen reader-compatible experience in a web browser includes displaying an interactive experience in a web browser on a computing device of a user, receiving an instruction to activate a native screen reader existing on the computing device within the browser, processing elements of the interactive experience to generate corresponding screen reader-compatible elements; and presenting a mirror interface of the interactive experience in the web browser with the screen reader-compatible elements displayed on the web browser with the native screen reader.

Receiving the instruction to activate the native screen reader can include sensing selection of a toggle displayed in the web browser. The method can include sensing deselection of the toggle and removing the mirror interface from the web browser upon deselection of the toggle. Processing elements of the interactive experience can include determining a priority of each element. Elements having a higher priority can be presented on the mirror interface before elements of a lower priority. Processing elements of the interactive experience can include determining a type of each element. The types of elements can include text and buttons. The method can include activating one or more affordances for the interactive experience within the mirror interface that enhance accessibility of the interactive experience. The one or more affordances can include providing additional time for a user to respond to a prompt within the interactive experience than when the mirror interface is not active. The one or more affordances can include providing for a delay between text announcements while the mirror interface is active. The one or more affordances can include providing additional audio describing the interactive experience than when the mirror interface is not active. The one or more affordances include providing additional instructions for the interactive experience than when the mirror interface is not active. Processing elements of the interactive experience to generate corresponding screen reader-compatible elements can include determining which elements of the interactive experience are considered decorative and not generating corresponding screen reader-compatible elements for the elements of the interactive experience that are considered decorative. Processing elements of the interactive experience to generate corresponding screen reader-compatible elements can include converting the elements from WebGL format to HTML5 format. The method can include receiving user interactions with the mirror interface submitted by the user with a keyboard. The method can include continually updating the mirror interface as the user advances through the interactive experience.

A system according to a second aspect disclosed herein can include a processor and a computer-readable medium. The computer-readable medium can store instructions that, when executed by the processor, cause the system to display an interactive experience in a web browser on a computing device of a user, receive an instruction to activate a native screen reader existing on the computing device within the browser, process elements of the interactive experience to generate corresponding screen reader-compatible elements and present a mirror interface of the interactive experience in the web browser with the screen reader-compatible elements displayed on the web browser with the native screen reader.

The system can receive the instruction to activate the native screen reader by sensing selection of a toggle displayed in the web browser. Processing elements of the interactive experience can include the system determining a type of each element and a priority for each element. The system can process elements of the interactive experience to generate corresponding screen reader-compatible elements by converting the elements from WebGL format to HTML5 format.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Unity3D is a cross-platform game engine that can be used to create three-dimensional and two-dimensional games as well as interactive simulations and other experiences. Web Graphics Library (WebGL) is a build option that enables Unity to publish content as JavaScript programs which use Hypertext Markup Language 5 (HTML5) technologies and the WebGL rendering API to run Unity content in a web browser on, for example, a laptop or desktop computer. However, there are no Unity3D WebGL standard libraries that integrate the screen reader used by low vision users for use in a web browser due to the complexity of design issues. Examples described herein reduce this complexity by providing a toggleable mirror interface that integrates with native device accessibility features.

When the accessible toggle is pressed, it signals to the Unity3D core logic to being to mirror the interface and puts a global variable/flag to communicate that the screen reader interface is active. This variable turns on certain affordances through the experience, such as ignoring anything tagged as decorative, adding additional timing to the experience, adding additional audio that executes via the screen reader interface, etc. The timing issue of properly ordering and populating the mirror interface is addressed by tagging the Unity inaccessible interface with the priorities/order and types of the matching screen reader interface types. In this way, the screen reader interface triggers the logic on the inaccessible interface that was tagged and affordances tagged with the flag. As the Unity3D experience progresses or as the user interacts, the tagged elements appear and disappear in the mirror/screen reader interface according to the logic of the experience.

This solution not only makes games and other highly interactive experiences compatible with desktop/laptop screen readers, but also provides for keyboard-only interaction, which is a different kind of accessibility consideration aimed at people with motility issues rather than vision-only issues.

The drawings depict elements of this disclosure for a more complete understanding of the mirror interface.

Figure 1:
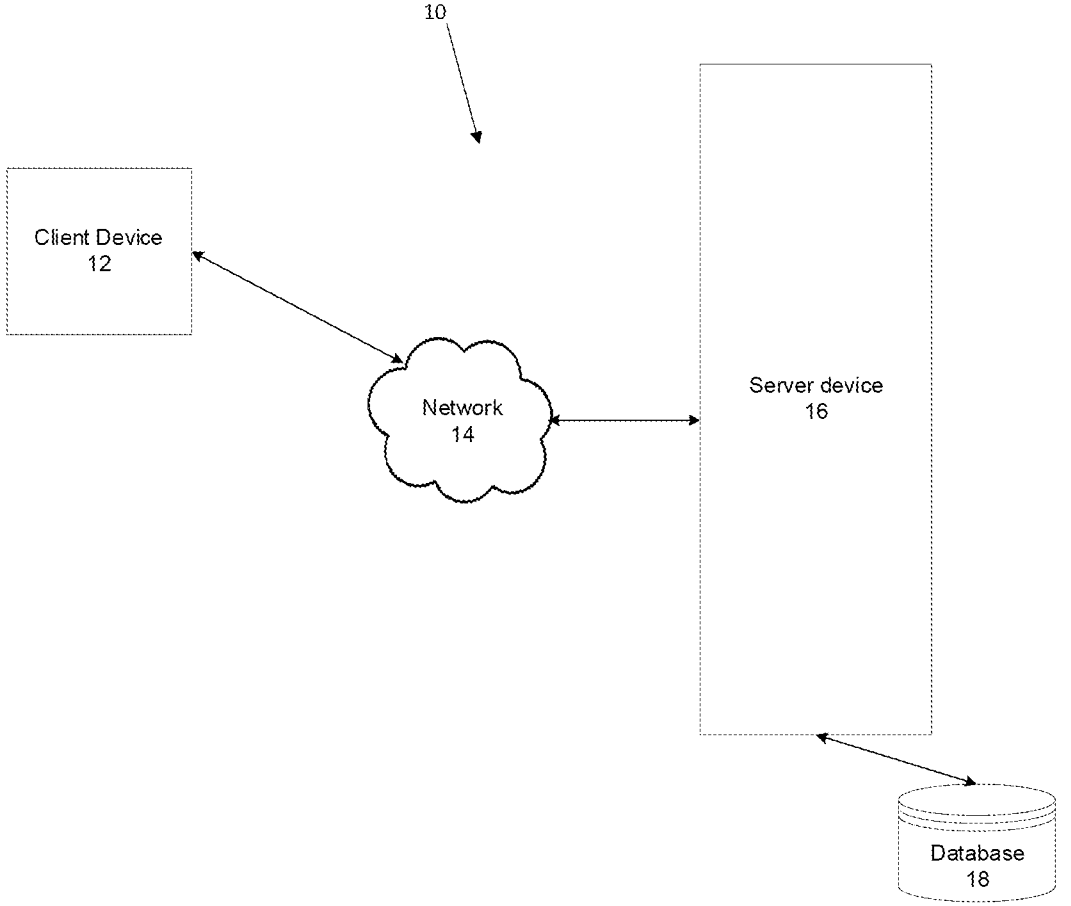
FIG. 1 depicts an exemplary system for providing a mirror interface for an accessible interactive experience in a web browser.

An exemplary system 10 for providing an accessible mirror interface for an accessible interactive experience in a web browser is depicted in FIG. 1. A client device 12 can be in communication with a server device 16 over a network 14. Client device 12 can be, for example, a laptop computer, desktop computer or other computing device. Server device 16 can transmit information for displaying and interacting with the interactive experience, some or all of which may reside in one or more databases 18 accessible to server device 16, to the client device 12 over network 14 for display of and progression through the interactive experience on client device.

Figure 2:
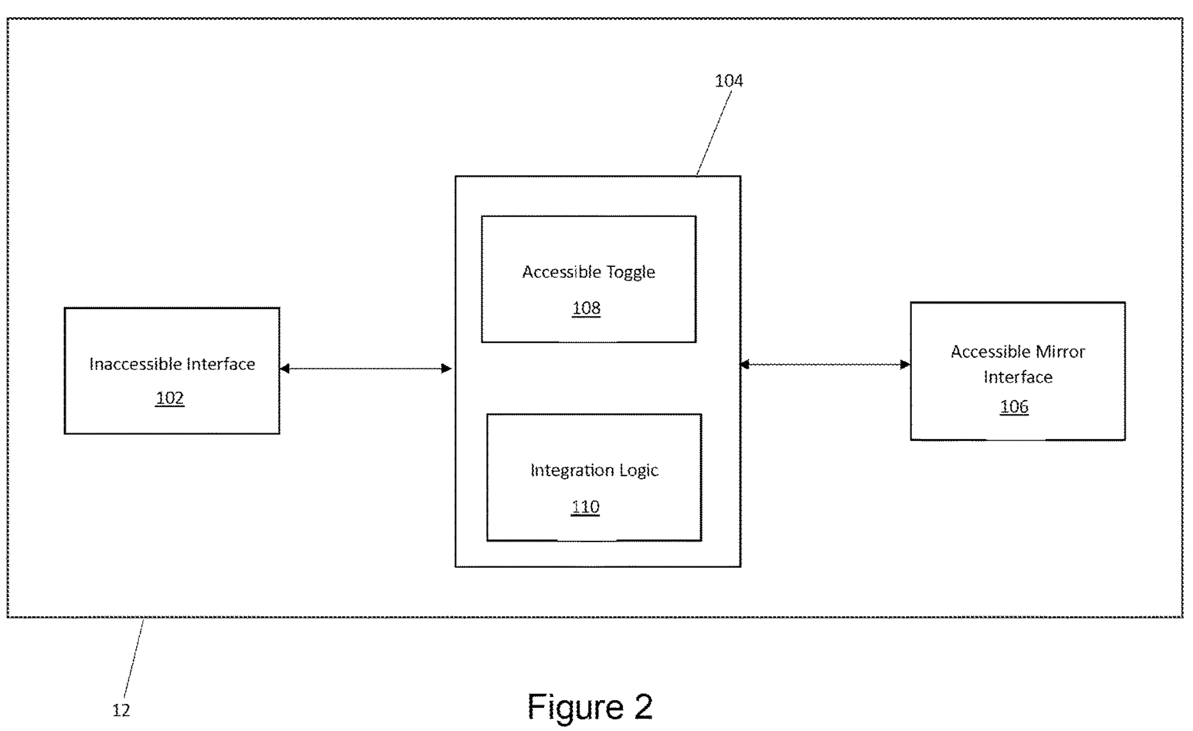
FIG. 2 depicts exemplary components of a client device of the system of FIG. 1.

FIG. 2 depicts exemplary components of the client device of FIG. 1 for providing an accessible mirror interface 106 for a user interactive experience. An inaccessible interface 102 may be initially presented on the client device 12. An accessibility engine 104 may be provided that can cause the system to provide an accessible mirror interface 106. In particular, a user-selectable accessible toggle 108 may be presented on the inaccessible interface. Selection of the accessible toggle 108 can activate integration logic 110 that provides for affordances for the accessibility concern and allows for timing issues that may occur using the mirror interface. Unlike a mobile environment in which the device can have an operating system setting that automatically determines that a screen reader should be turned on, in a web browser environment the system can't access such settings from the browser. The toggle 108 therefore provides a mechanism to inform the system 100 that the accessible mirror interface 106 is needed. This solves the accessibility issue for highly interactive web-based experiences by addressing the issue as an interface problem that modularizes the problem to allow for standardization of complex accessibility interfaces, instead of addressing the issue as a specific experience design problem. Although depicted as being executed on client device 12, it should be noted that integration logic 110 could reside on server device 16 or another device in communication with client device 12 over network 14.

Figure 3:
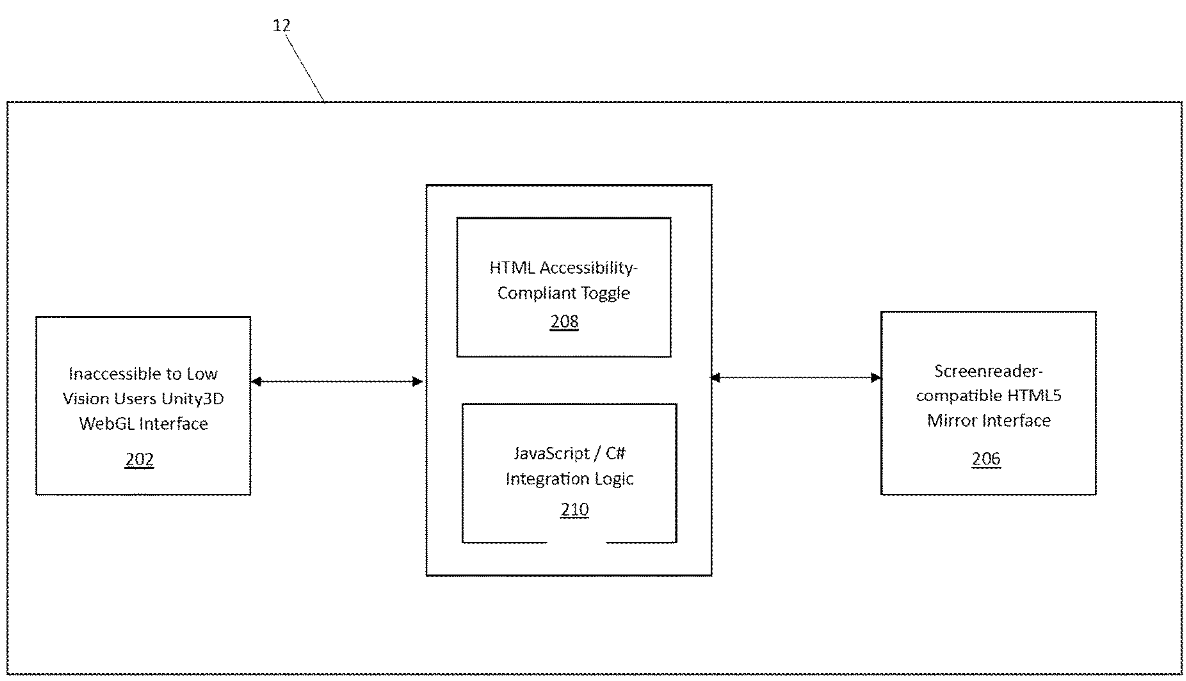
FIG. 3 depicts additional exemplary components of the client device of FIG. 1.

FIG. 3 exemplary components of the client device 12 of FIG. 1 for providing a screen reader compatible interface for Unity3D WebGL output. With the disclosed technique, the complexity is reduced to integrating a mirror interface. A standard Unity3D WebGL interface 202 may initially be presented on a web browser on client device 12 that will be inaccessible to low vision users due to the issues noted herein. When an HTML accessibility-compliant toggle 208 is activated, a signal is sent to the Unity3D core logic to begin to mirror the interface using JavaScript/C#integration logic 210 as a screen reader-compatible mirror interface 206.

A global variable/flag can communicate to the Unity3D core logic that the screen reader interface is active. This activates certain affordances throughout the experience that can depend on the specific experience being mirrored within the browser that can include, for example, ignoring anything tagged as decorative, adding additional timing to the experience, adding additional audio that executes via the screen reader interface, etc. Timing issues for properly ordering and populating the screen reader-compatible mirror interface 206 can be addressed by the integration logic by tagging the inaccessible interface 202 with the priorities, order and types of the matching screen reader interface types. In this way, the screen reader-compatible mirror interface 206 triggers the logic in the inaccessible interface 202 that was tagged as well as affordances tagged with the flag. As the experiences progresses on the web browser or as the user interacts with the web browser, the tagged elements appear and disappear in the screen reader-compatible mirror interface 206 according to the logic for the experience. As noted above, although depicted as being executed on client device 12, it should be noted that integration logic 210 could reside on server device 16 or another device in communication with client device 12 over network 14.

Figure 4:
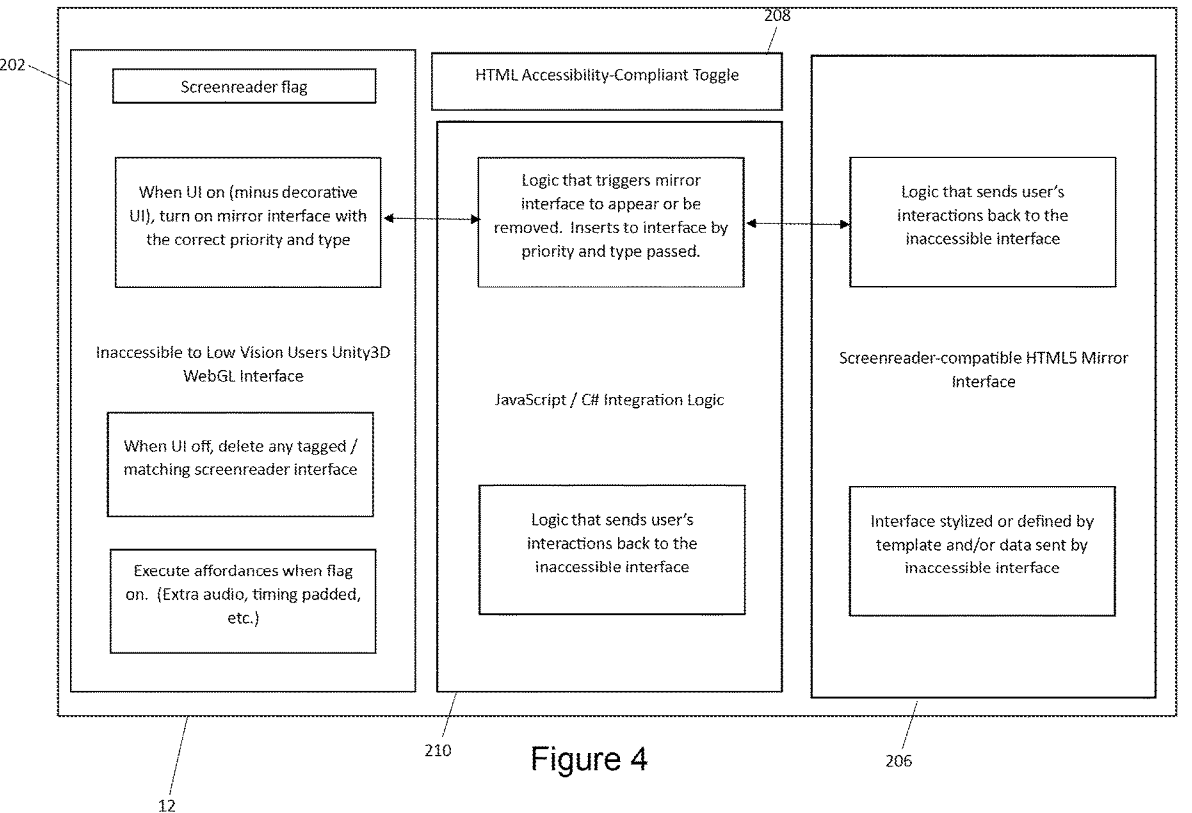
FIG. 4 depicts an example of applied logic carried out on the client device of FIG. 1.

An example of the applied logic for a screen reader for Unity WebGL output operating on client device 12 is depicted in FIG. 4. As noted above, when the HTML accessibility-compliant toggle 208 is activated a screen reader flag is placed within the inaccessible Unity3D WebGL interface 202 that signifies to the inaccessible interface to activate the screen reader-compatible mirror interface 206. The type and priority of different aspects of the inaccessible Unity3D WebGL interface 202 are sent to the integration logic 210 for processing and generation of a screen reader-compatible element, such as an announcement audibly reciting text. The priority of aspects of the inaccessible interface 202 relates to the order in which the aspects are announced or otherwise presented to the user on the screen reader-compatible mirror interface 206. For example, in the case of an interactive three-dimensional scene, the priority may provide for what the scene depicts to first be announced and subsequently to describe what actions the user can take in response to the scene. Different aspects of the interface can have different priority and be announced in a different order. Delays can be added in order to enable a user to interact with the interface prior to a subsequent announcement. The type of the aspect of the interface is sent to the integration logic 210 because different types may need to be processed differently to provide an accessible experience. Types of user interface aspects can include, for example, buttons, slider/radio buttons, text, images/videos, decorative elements (which will generally be removed/ignored), etc. The screen reader flag will also cause any affordances to execute within the experience including extra audio describing an aspect of the interface, extra timing provided for the user to interact with the interface before the experience progresses, etc. If the toggle 208 is deselected, the system 200 will delete the accessible aspects mirrored onto the interface to revert to the inaccessible interface 202.

The Javascript/C#integration logic 210 controls sending of announcements and controls to the screen reader. Based on the types and priorities determined based on the information from the inaccessible interface 202, the integration logic 210 will communicate to the screen reader-compatible mirror interface 206 to activate aspects of the interface (e.g., make an announcement). The integration logic 210 can also communicate back to the inaccessible interface 202 after sending out these communications to the screen reader-compatible mirror interface 206. This aids in timing subsequent announcement and interactions as the inaccessible interface advances through the experience. The integration logic can include a JavaScript library that communicates between the C#language used by Unity and JavaScript used for the web browser in order to provide output for the HTML5 accessible interface interpreted by the screen reader. Although depicted as being carried out on client device 12, some or all of this logic can be carried out on a server device 16 or other device in communication with client device over a network 14.

The screen reader-compatible mirror interface 206 presents an interface stylized or defined by a template based on data sent by the inaccessible interface 202 and processed by the integration logic 210 for presentation on the screen reader-compatible mirror interface 206. The template can define how various aspects of the inaccessible interface 202, such as buttons, are presented on the screen reader-compatible mirror interface 206. The screen reader-compatible mirror interface 206 can also include logic that sends the user's interactions back to the inaccessible interface 202 for progressing through the interactive experience.

Figure 5:
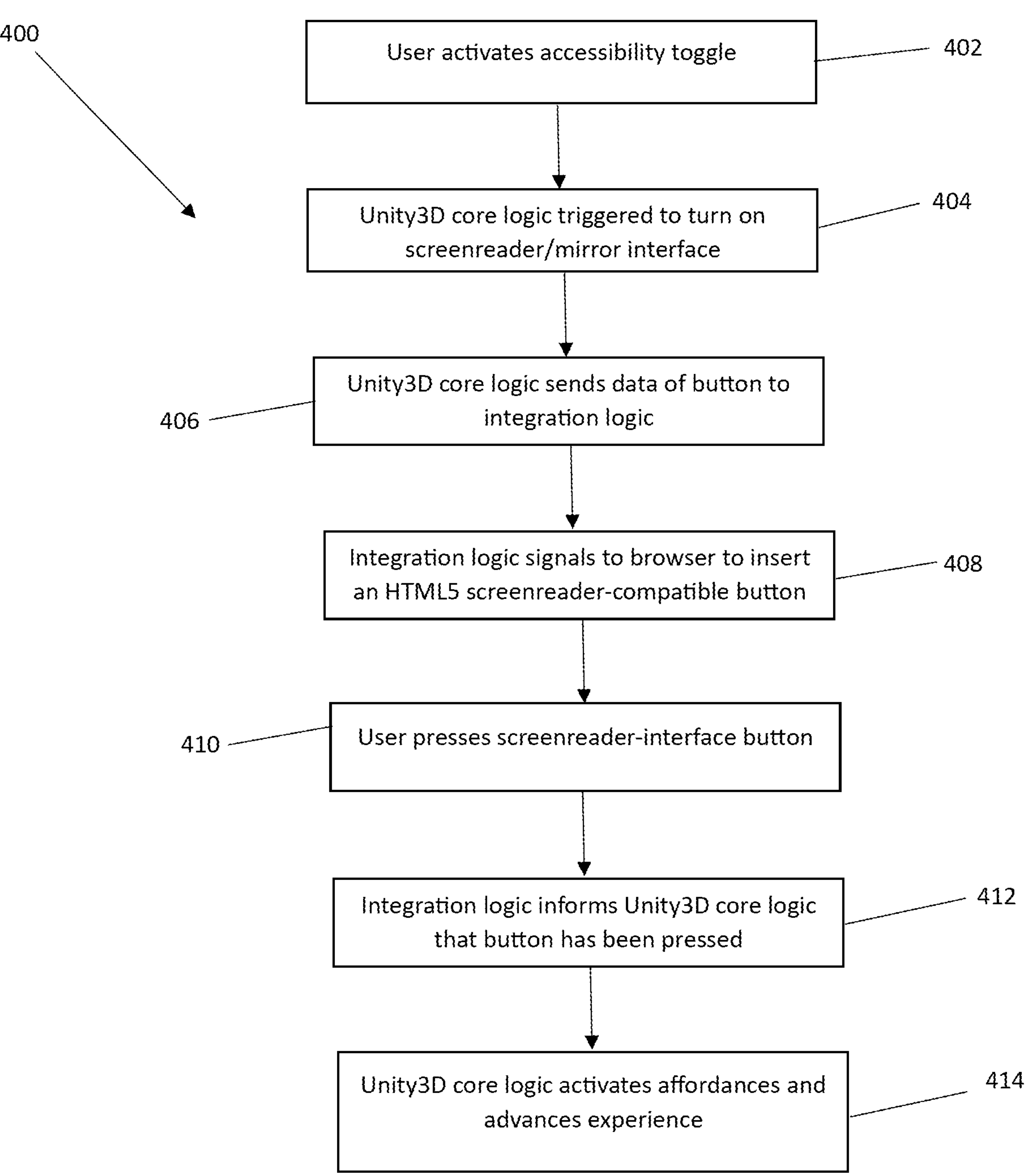
FIG. 5 depicts a method for mirroring one particular aspect of an inaccessible interface into an accessible interface executed on the client device of FIG. 1.

FIG. 5 depicts an example method 400 for mirroring one particular aspect of an inaccessible interface into an accessible interface on a device such as client device 12. In particular, this figure describes mirroring an inaccessible native Unity3D WebGL button on a web browser as an HTML5 accessible button. At step 402, the user activates an accessibility toggle, such as, for example, toggle 208 described above. Activation of the toggle triggers the Unity3D core logic to turn on the screen reader/mirror interface at step 404. The Unity3D core logic then sends data of the button to the integration logic at step 406. For example, the data sent could be as follows: Order: 4, ID: Button-123, Parent: View-123, Announce: "Button available, Announce Priority: 6. Therefore, in this example the button would be put on the screen fourth (Order) and would be identified as Button-123 (ID). The "Parent; View-123" tag can identify to the integration logic where the button should be nested on the user interface. The final items of data indicate an announcement will audibly inform the user that the button is available with that announcement having the sixth priority with respect to other announcements. At step 408, the integration logic signals to the mirrored browser to insert an HTML5 screen reader-compatible button in the order and location provided at step 406. The screen reader will announce the availability of the button in the manner defined in the data provided at step 406, which may be delayed following insertion of the button if other higher priority announcements need to be made. A user may actuate the screen reader interface button at step 410. In response, the integration logic will inform the Unity3D core logic at step 412 that the button has been actuated. The Unity3D core logic will then at step 414 execute any affordances due to execute based on activation of the button, such as, for example, additional time in the experience, audio announcing the result of the button, etc. and advance the experience as a result of the press of the button. The interactive experience will then proceed according to the logic of the experience, with the Unity3D core logic of the inaccessible interface transmitting information on further aspects of the interface for processing by the integration logic to generate screen reader-compatible elements as the experience progresses.

Figure 6A:
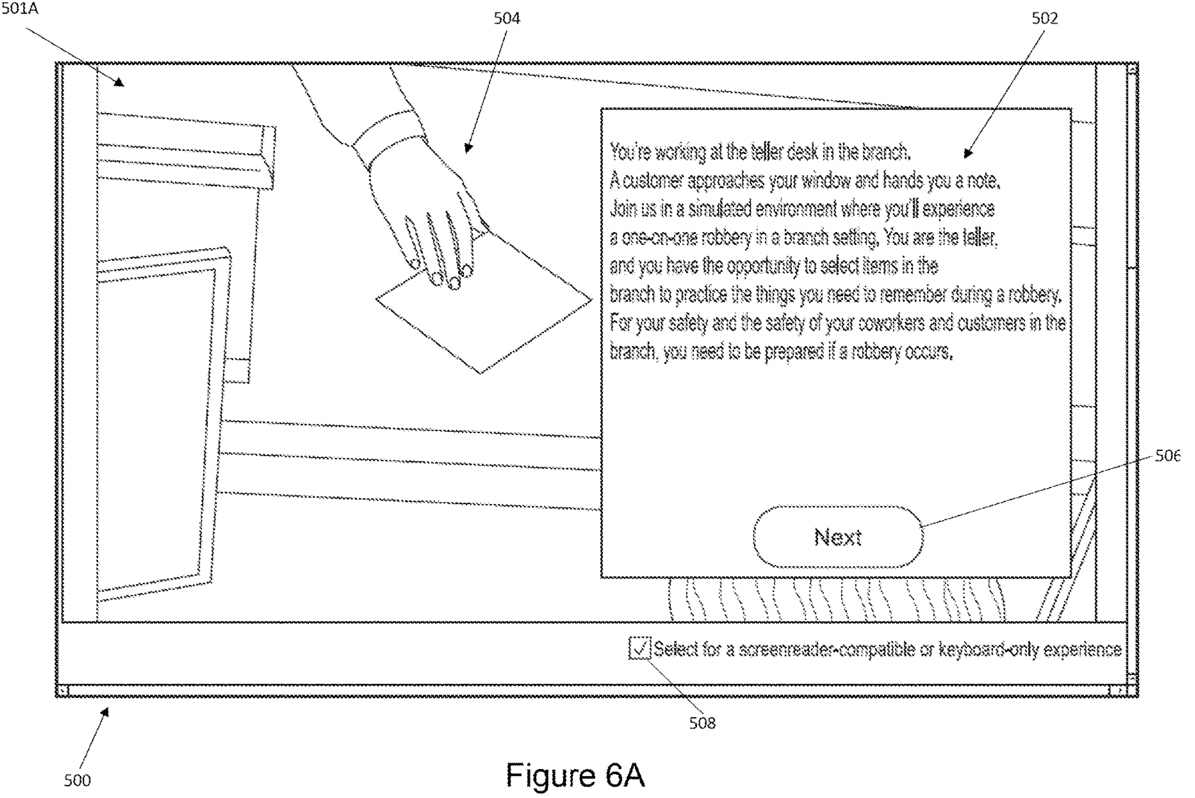
FIGS. 6A and 6B depict an example web browser having mirror interface capabilities for display on the client device of FIG. 1.
Figure 6B:
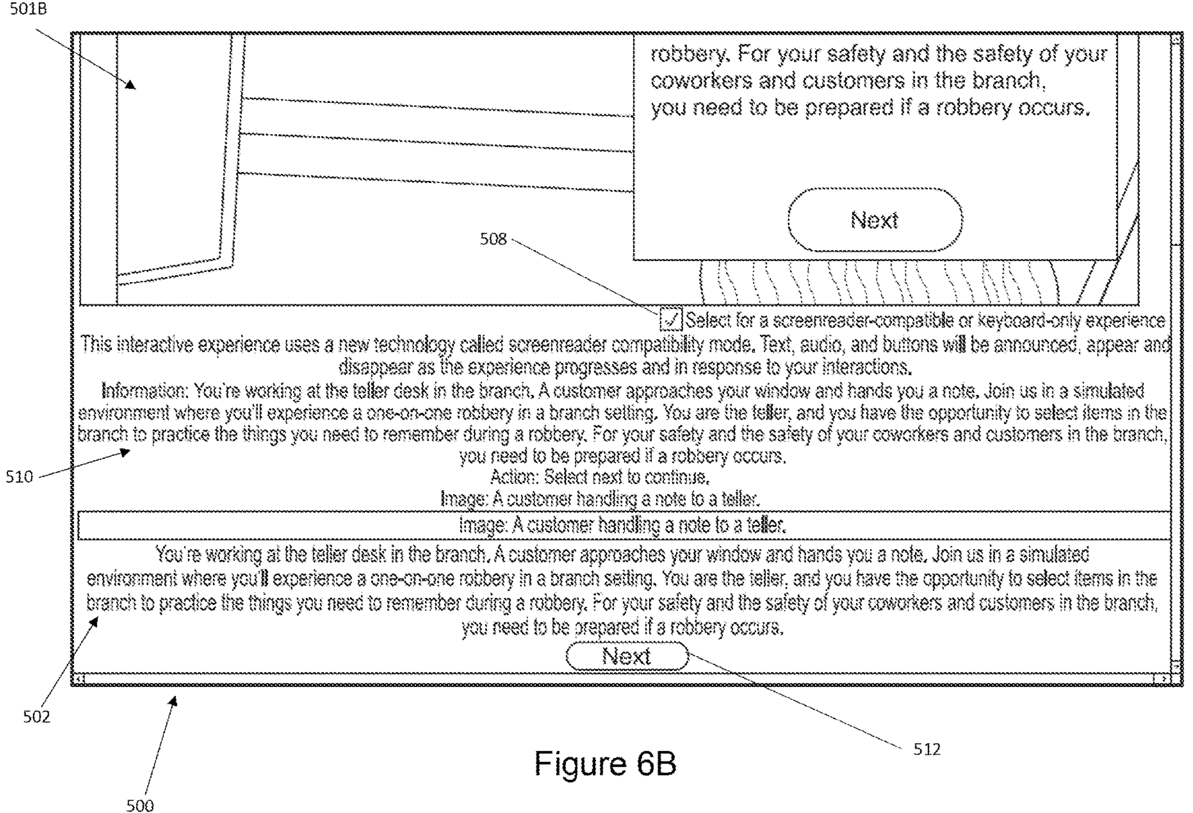

FIGS. 6A and 6B depict an example web browser 500 having the mirror interface capabilities described herein that can be displayed on a computing device such as client device 12. In this instance, the web browser 500 is providing an interactive user training experience for a bank employee. An inaccessible interface 501A of the web browser 500 is depicted in FIG. 6A. The example screen of the interactive user training experience includes a description 502 of an event in the experience and an image 504 corresponding to the description. The user would select a Next button 506 to advance the experience. To activate a screen reader compatible experience, a toggle 508 can be selected.

Upon selecting the toggle 508, the processes described above execute and the resulting screen reader-compatible mirror interface 501B is depicted in FIG. 6B. Announcements 510 that are read audibly to the user appear above the original description 502. The image 504 from the inaccessible interface 501A was tagged as decorative and has been removed from the screen reader-compatible mirror interface 501B. Instead, one of the announcements 510 verbally informs the user what was shown in the image. The user will also be verbally informed that the experience can be advanced by selecting the Next button 512, which on this screen will be provided with native screen reader formatting for selection by the user.

As also noted in the announcements, from the screen-reader compatible mirror interface 501B the user will be able to advance through the experience with text, audio and buttons being announced and appearing and disappearing as the experience progresses in response to the user's interactions. At any point during the experience, the screen reader compatibility mode can be exited by the user deselecting the toggle 508 to return to the inaccessible interface 501A. The user's interactions with screen reader-compatible mirror interface 501B can be through various means, such as, for example, computer mouse, keyboard, touchscreen, voice command, etc. Advantageously, users with motility issues who interact with computers solely by using a keyboard can interact with screen reader-compatible mirror interface 501B and navigate the experience with only a keyboard.

Although the screen reader compatibility mode is specifically described herein as being activated by a user selection of a "toggle" it should be noted that other types of activation input informing the system that a screen reader is needed can be provided. However, in the context of a web browser, the system cannot automatically detect a need for a screen reader so some form of activation input informing the browser that the screen reader should be provided.

Although primarily described herein with respect to a Unity3D game engine, the mirror interface described herein could be adapted to other game engines that use HTML, such as Gamemaker, Godot Engine, Unreal Engine and any other platform that outputs to an inaccessible format and game development engine that creates WebGL files for output and allows communication with the parent HTML object.

Figure 7:
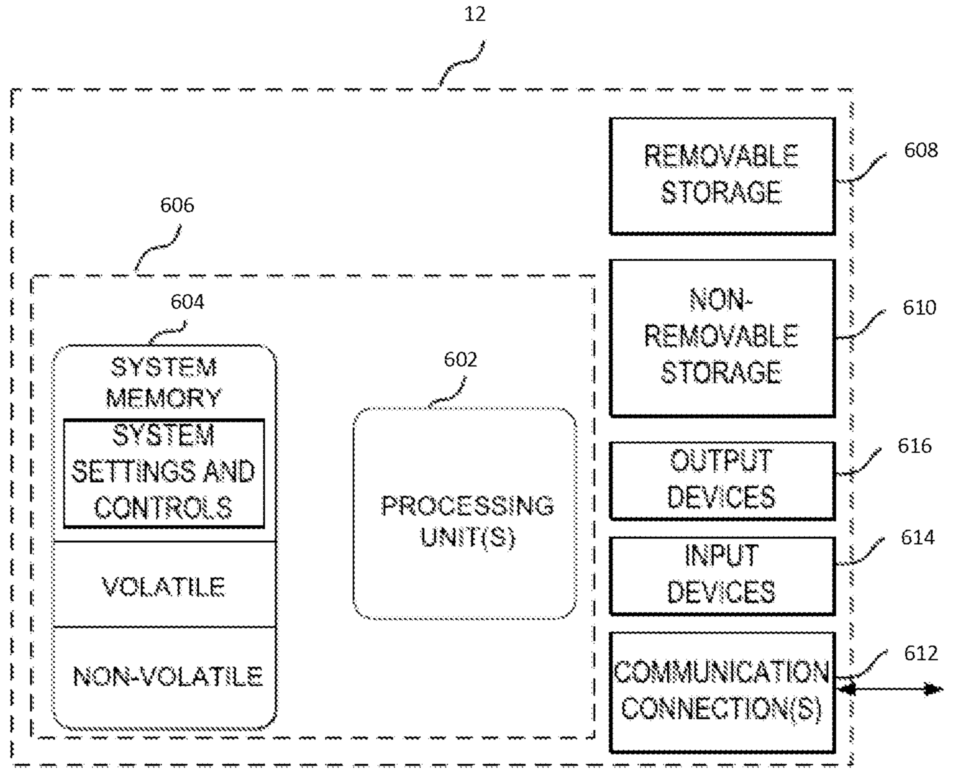
FIG. 7 depicts one example of components of the client device of FIG. 1.

FIG. 7 depicts one example of the components of the client device 12 on which one or more of the present examples can be implemented. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, instructions to control the eject the samples, move the stage, or perform other methods disclosed herein) can be volatile (such as RAM), non-volatile (such as ROM, flash memory, etc.), or some combination of the two. This most basic configuration is illustrated in FIG. 7 by dashed line 606. Further, operating environment 600 can also include storage devices (removable, 608, and/or non-removable, 610) including, but not limited to, magnetic or optical disks or tape. Similarly, environment 600 can also have input device(s) 614 such as touch screens, keyboard, mouse, pen, voice input, etc., and/or output device(s) 616 such as a display, speakers, printer, etc. Also included in the environment can be one or more communication connections 612, such as LAN, WAN, point to point, Bluetooth, RF, etc.

Operating environment 600 typically includes at least some form of computer readable media. Computer readable media can be any available media that can be accessed by processing unit 602 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 600 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by operating environment 600 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, operating environment 600 is part of a network that stores data in remote storage media for use by the operating environment 600.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For example, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method of providing a user-interactive screen reader-compatible experience in a web browser, comprising:

displaying an interactive experience in the web browser on a computing device of a user;

receiving an instruction to activate a native screen reader existing on the computing device within the web browser, wherein the web browser is unable to detect that the native screen reader is active on the computing device, and wherein receiving the instruction includes receiving a user input that informs the web browser that the native screen reader is active on the computing device;

processing elements of the interactive experience to generate corresponding screen reader-compatible elements; and presenting a mirror interface of the interactive experience in the web browser with the screen reader-compatible elements displayed on the web browser and accessible to the native screen reader.

2. The method of claim 1, wherein receiving the instruction to activate the native screen reader includes sensing selection of a toggle displayed in the web browser.

3. The method of claim 2, further comprising sensing deselection of the toggle and removing the mirror interface from the web browser upon deselection of the toggle.

4. The method of claim 1, wherein processing elements of the interactive experience includes determining a priority of each element.

5. The method of claim 4, wherein elements having a higher priority are presented on the mirror interface before elements of a lower priority.

6. The method of claim 1, wherein processing elements of the interactive experience includes determining a type of each element.

7. The method of claim 6, where the type of each element includes text and buttons.

8. The method of claim 1, further comprising activating one or more affordances for the interactive experience within the mirror interface that enhance accessibility of the interactive experience.

9. The method of claim 8, wherein the one or more affordances include providing additional time for the user to respond to a prompt within the interactive experience than when the mirror interface is not active.

10. The method of claim 8, wherein the one or more affordances include providing for a delay between text announcements while the mirror interface is active.

11. The method of claim 8, wherein the one or more affordances include providing additional audio describing the interactive experience than when the mirror interface is not active.

12. The method of claim 8, wherein the one or more affordances include providing additional instructions for the interactive experience than when the mirror interface is not active.

13. The method of claim 1, wherein processing elements of the interactive experience to generate the corresponding screen reader-compatible elements includes:

determining which elements of the interactive experience are considered decorative; and not generating the corresponding screen reader-compatible elements for the elements of the interactive experience that are considered decorative.

14. The method of claim 1, wherein processing elements of the interactive experience to generate the corresponding screen reader-compatible elements includes converting the corresponding screen reader-compatible elements from Web Graphics Library format to Hypertext Markup Language 5 format.

15. The method of claim 1, further comprising receiving user interactions with the mirror interface submitted by the user with a keyboard.

16. The method of claim 1, further comprising continually updating the mirror interface as the user advances through the interactive experience.

17. A system comprising:

a processor; and a computer-readable medium storing instructions that, when executed by the processor, cause the system to:

display an interactive experience in a web browser on a computing device of a user;

receive an instruction to activate a native screen reader existing on the computing device within the web browser, wherein the web browser is unable to detect that the native screen reader is active on the computing device, and wherein receiving the instruction includes receiving a user input that informs the web browser that the native screen reader is active on the computing device;

process elements of the interactive experience to generate corresponding screen reader-compatible elements; and present a mirror interface of the interactive experience in the web browser with the screen reader-compatible elements displayed on the web browser and accessible to the native screen reader.

18. The system of claim 17, further comprising instructions that, when executed by the processor, cause the system to activate the native screen reader by sensing selection of a toggle displayed in the web browser.

19. The system of claim 17, further comprising instructions that, when executed by the processor, cause the system to determine a type of each element and a priority for each element.

20. The system of claim 17, further comprising instructions that, when executed by the processor, cause the system to convert the corresponding screen reader-compatible elements from Web Graphics Library format to Hypertext Markup Language 5 format.

* * * * *